United States Patent [19]
Hosono

[11] 4,075,644
[45] Feb. 21, 1978

[54] MOTOR DRIVE MEANS FOR MOTOR DRIVEN SINGLE LENS REFLEX CAMERA

[75] Inventor: Tsutomu Hosono, Omiya, Japan

[73] Assignee: Fuji Photo Optical Co., Ltd., Omiya, Japan

[21] Appl. No.: 721,233

[22] Filed: Sept. 8, 1976

[30] Foreign Application Priority Data

Sept. 12, 1975 Japan .................... 50-110626

[51] Int. Cl.$^2$ .................................................. G03B 1/18
[52] U.S. Cl. ...................................... 354/173; 354/213
[58] Field of Search ............... 354/153, 156, 62, 63, 354/170, 171, 173, 206, 213

[56] References Cited

U.S. PATENT DOCUMENTS

| | | | |
|---|---|---|---|
| 3,656,420 | 4/1972 | Aizawa et al. | 354/173 |
| 3,754,455 | 8/1973 | Tsujimoto et al. | 354/173 |
| 3,913,115 | 10/1975 | Mueller et al. | 354/213 |
| 4,015,198 | 3/1977 | Iwashita et al. | 354/173 X |

*Primary Examiner*—L. T. Hix
*Assistant Examiner*—William B. Perkey

[57] ABSTRACT

An electric switch means for turning on and off a film wind-up motor in a single lens reflex camera is provided in a camera. The switch means is operated to start the motor upon supply of electric power to the camera or upon turning off of a solenoid provided in the camera for swinging up a mirror. The switch means is connected with a film perforation detecting device so that the switch is operated to stop the motor when the detecting device detects a perforation in the film. The film has one perforation per frame. Further, a timer is connected between the switch means and the motor to stop the motor when a time determined by the timer has lapsed for feeding the trailing portion of the film and stopping the film after the trailing portion is completely wound up.

5 Claims, 3 Drawing Figures

MOTOR DRIVE MEANS FOR MOTOR DRIVEN SINGLE LENS REFLEX CAMERA

BACKGROUND OF THE INVENTION

1. Field of the Invention

This invention relates to a device for driving a motor in a camera, and more particularly to a device for automatically driving a motor for winding up a film loaded in a single lens reflex camera.

2. Description of the Prior Art

In a photographic camera provided with a film wind-up motor which automatically winds up a film loaded in the camera when the film is put into the camera body or the shutter is released, a number of mechanical switches are provided in the camera body so as to be operated upon actuation or operation of various mechanical parts in the camera. For instance, the switches are operated upon closure of a back cover of the camera, rotation of a cam associated with a frame counter or operation of a shutter release mechanism.

In the conventional cameras provided with a film wind-up motor and mechanical switches as described above, there are defects in that the motor may be inadvertently started before the back cover is completely closed or the start of the motor is liable to be delayed by the mechanical delay of the mechanism including the cam associated with the switch.

SUMMARY OF THE INVENTION

The primary object of the present invention is to provide a photographic camera with a film wind-up motor in which the leading portion of the film is automatically fed upon supply of electric power to the camera.

Another object of the present invention is to provide a single lens reflex camera provided with a film wind-up motor in which the film is automatically fed upon turning OFF of a solenoid for operating a mirror in the camera.

Still another object of the present invention is to provide a single lens reflex camera with a film wind-up motor in which the trailing portion of the film is automatically fed upon turning OFF of a solenoid for operating a mirror in the camera.

A further object of the present invention is to provide a single lens reflex camera with a film wind-up motor in which the film is automatically fed without a delay.

The above objects are accomplished by eliminating the mechanical switches in the camera body and substituting therefor electronic switch means which are operated upon supply of electric power or operation of electric circuits. More specifically, the camera in accordance with the present invention is provided with an electric switch means for starting a film wind-up motor which is closed upon supply of electric power to the camera or upon turning OFF of a solenoid used for swinging up a mirror in the camera. Further, the camera of this invention is provided with a perforation detecting means which detects perforations in the film loaded in the camera and turns OFF said switch means upon detection of a perforation. The camera of this invention is loaded with a film having one perforation per frame. This sort of film will hereinafter be referred to as one perforation per frame type film. Thus, the film is automatically fed when the camera is supplied with electric power or the solenoid for swinging up a mirror is turned OFF after the shutter is released. Feeding of the film continues until the perforation detecting means detects the perforation of the next frame.

Further, the camera in accordance with the present invention is provided with a timer circuit connected between the film wind-up motor and the switch means for turning OFF the motor when a time determined by the timer has lapsed. The timer circuit serves to stop the motor after all frames have been exposed and the trailing portion of the film has been automatically fed. The motor is stopped after completion of wind-up of the film when the time determined by the timer circuit has lapsed without detection of a film perforation by the perforation detecting means.

DESCRIPTION OF THE PREFERRED EMBODIMENT

Figure 1:
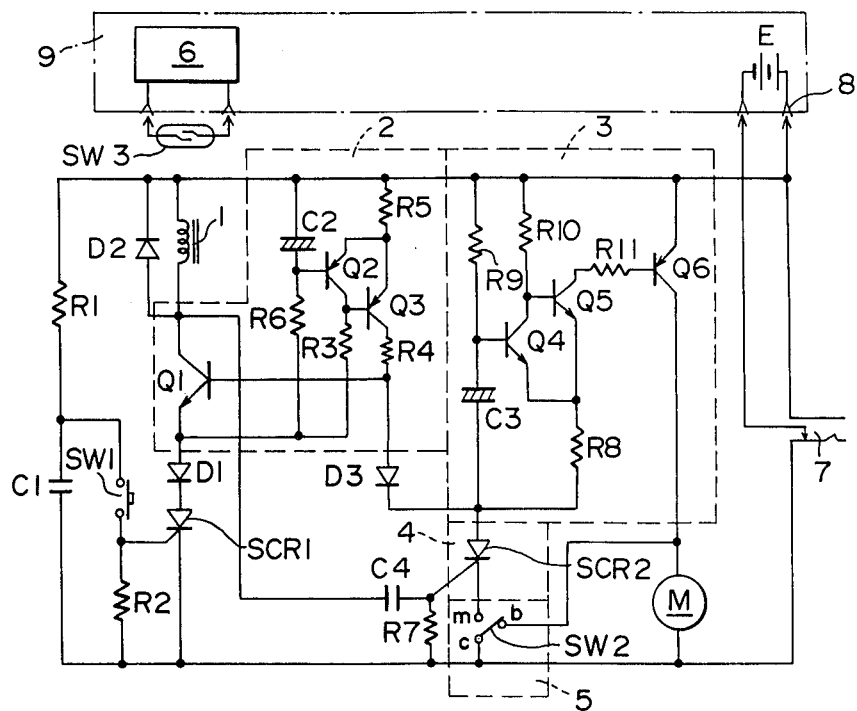
FIG. 1 is a view of the circuit for controlling a film wind-up motor employed in the camera in accordance with one embodiment of the present invention.

FIG. 1 shows an embodiment of the electric circuit for a motor drive means for a single lens reflex camera for an endoscope in accordance with the present invention in which a photographic film having one perforation per frame and having no perforations in the leader and trailer portions is loaded in the camera. Referring to FIG. 1, a solenoid 1 which moves a mirror up and moves an operating member 16 shown in FIG. 2 in the direction indicated by an arrow is connected in series with a thyristor SCR1 which is triggered by a shutter release button SW1, a diode D1 and a transistor Q1 of a time constant circuit 2. A resistor R1 for charging a capacitor C1 and a resistor R2 for discharging the capacitor C1 are connected by way of said shutter release button SW1, and the capacitor C1 is connected in parallel with the shutter release button SW1 and the second resistor R2. The divided potential obtained by the resistors R1 and R2 is set low enough to prevent turning ON of the thyristor SCR1. Thus, a circuit for triggering the thyristor SCR1 is constituted.

The time constant circuit 2 is constituted of a capacitor C2, a resistor R6 for charging the capacitor C2, transistors Q2 and Q3 for amplifying the potential across the capacitor C2, an emitter resistor R5, and collector resistors R3 and R4.

A timer circuit 3 is provided for turning OFF a film wind-up motor M when a predetermined time has lapsed after the motor M is energized. The timer circuit 3 is constituted of a capacitor C3, a resistor R9 for charging the capacitor C3, transistors Q4, Q5 and Q6 for amplifying the potential across the capacitor C3, an emitter resistance R8 and collector resistances R10 and R11. The timer circuit 3 is connected with a changeover switch means 5 by way of a switching element 4 (or thyristor SCR2) which is triggered by the output from the connecting point between said solenoid 1 and said transistor Q1 by way of a capacitor C4 and a resistance R7. Said time constant circuit 2 is connected with the switch means 5 by way of a diode D3 and said thyristor SCR2.

The switch means 5 is comprised of a transformer contact switch SW2 having a common terminal $c$, a make terminal $m$ and a break terminal $b$. The common terminal $c$ is grounded, the make terminal $m$ is connected with the cathode terminal of the thyristor SCR2, and the break terminal $b$ is connected with the positive terminal of the motor M. An automatic exposure control circuit 6 is connected with a lead relay SW3 which is closed when the mirror is swung up by said solenoid 1. The exposure control circuit 6 is triggered by the lead relay SW3 to control the exposure time in accordance with the scene brightness. The exposure control circuit 6 is built in a light source device 9 for an endoscope which contains a power source E for driving the motor M. The power source E is electrically connected with said time constant circuit 2, timer circuit 3 and motor M by way of a connector 8. When an external power source is used, an external power jack 7 is used instead of the connector 8.

Figure 2:
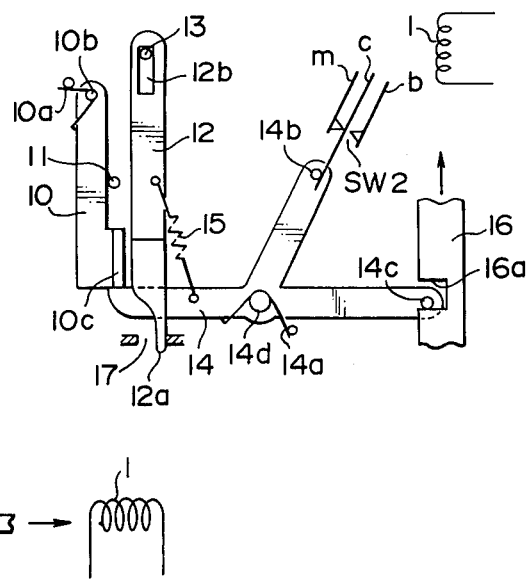
FIG. 2 is a schematic fragmentary view showing the mechanism including a film perforation detecting means and a switch means for stopping the film wind-up motor in response to detection of a film perforation.

FIG. 2 shows a mechanism associated with said change-over switch means 5. An engaging lever 10 pivotally mounted on a pivot 10b is spring urged by a spring 10a in the counterclockwise direction and prevented from rotation by an engaging pin 11. A perforation detecting lever 12 having a detecting claw 12a and an elongated hole 12b is engaged at its elongated hole 12b with a support shaft 13 and is spring urged downwardly by a spring 15 tensioned between the same and a feed lever 14. The detecting claw 12a is engaged with a slot 17 provided in a film feed wall along which a film is fed, whereby the movement of the perforation detecting lever 12 is limited. Said feed lever 14 is pivotally mounted on a pivot 14d and is spring urged in the clockwise direction by a spring 14a. The clockwise rotation of the feed lever 14 is limited by the abutment of an end thereof on an engaging portion 10c of said engaging lever 10. The feed lever 14 has two arms one of which has a pin 14b engaged with said common terminal $c$ of said switch means SW2 and the other has a pin 14c engaged with a cut-away portion 16a of an operating member 16 which is moved in the direction indicated by an arrow when said solenoid 1 is turned ON.

Figure 3:
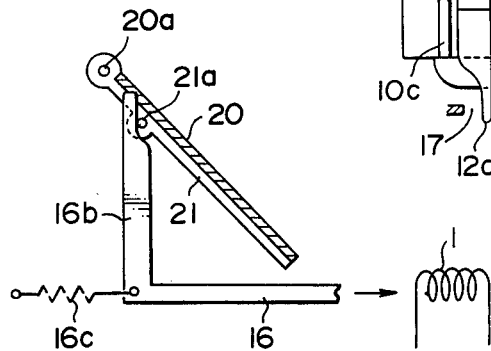
FIG. 3 is a fragmentary view showing an operating member associated with a mirror of the camera operated by a solenoid in the camera.

FIG. 3 shows a mechanism for swinging up a mirror by use of said solenoid 1. A mirror 20 is fixed on a mirror support plate 21 which is swingably mounted on a shaft 20a and is spring urged in the clockwise direction. The mirror support plate 21 is provided with a pin 21a fixed thereto which is engaged with an arm 16b of the operating member 16. The operating member 16 is moved in the direction indicated by an arrow overcoming the force of a tension spring 16c when the solenoid 1 is energized. By the movement of the operating member 16 in said direction, the mirror 20 is swung up. When the solenoid 1 is deenergized, the operating member 16 is moved in the direction opposite to the indicated direction by the tension of the spring 16c and the mirror 20 is moved down.

The operation of the preferred embodiment of the present invention will now be described in detail with reference to FIGS. 1 to 3. A photographic film having one perforation per frame is loaded in a camera body and the camera body is coupled with an endoscope. By coupling an endoscope with a built-in power source to the camera body or by coupling a power source to the external power jack 7 to energize the circuit in the camera body as shown in FIG. 1, the thyristor SCR2 is turned ON by the current flowing through the solenoid 1, capacitor C4 and resistor R7 and the transistor Q6 is turned ON to drive the motor M since the common terminal $c$ of the switch means SW2 is in contact with the make terminal $m$. The drive of the motor M is continued until the common terminal $c$ is brought into contact with the break terminal $b$ by the first perforation of the film as described in detail hereinafter. Since the current flowing though the solenoid 1 has been differentiated through the capacitor C4, it is not high enough to turn ON the solenoid 1.

When the shutter release button SW1 is depressed for taking a first picture, said capacitor C1 is discharged and the thyristor SCR1 is turned ON. Even if the release button SW1 is kept in the depressed state, there is no fear of continuously taking pictures since the divided potential obtained by the resistors R1 and R2 is not able to turn ON the thyristor SCR1. Upon the turn-ON of the thyristor SCR1, a base current flows through the transistor Q3 by way of diode D1, resistor R3 and resistor R5. Therefore, the transistor Q3 is turned ON to allow a base current to flow through transistor Q1 by way of resistor R4. Thus, the transistor Q1 is turned ON and the solenoid 1 is energized.

By the energization of the solenoid 1, the mirror 20 is swung up and the operating member 16 is moved in the direction indicated by an arrow in FIGS. 2 and 3. Accordingly, the common terminal $c$ of the switch SW2 contacts the make terminal $m$. In response to the swing up of the mirror 20, the lead relay SW3 is turned ON and the automatic exposure control circuit 6 is operated to close a light source shutter when a proper exposure time has lapsed. During the above operation, capacitor C2 is charged through resistor R6. When the potential across the capacitor C2 has reached a predetermined level, transistor Q2 is turned ON and transistor Q3 is turned OFF, and accordingly, transistor Q1 is turned OFF and thyristor SCR1 is turned OFF. By the turn-OFF of the transistor Q1, the solenoid 1 is turned OFF and the mirror 20 is swung down, and accordingly, the operating member 16 is moved back to its original position in the direction opposite to the direction indicated by the arrow. Simultaneously, the potential at the collector terminal of the transistor Q1 is raised to turn ON the thyristor SCR2. Therefore, a base current flows through transistor Q5 to turn it ON and transistor Q6 is turned ON to start the motor M to wind up the film.

Then, when a perforation of the film comes into engagement with the detecting claw 12a shown in FIG. 2, the common terminal $c$ makes contact with the break terminal $b$ and the opposite terminals of the motor M are short-circuited to quickly stop the motor M. In more detail, referring to FIG. 2, when a perforation of the film is engaged with the detecting claw 12a of the perforation detecting lever 12, the lever 12 is moved to the left to push the engaging portion 10c of the engaging lever 10. Thus, the engaging lever 10 is disengaged from the end of the feed lever 14 to allow the clockwise rotation of the feed lever 14. The feed lever 14 is accordingly rotated clockwise around the pivot 14d by the force of the spring 14a. As the feed lever 14 rotates clockwise, the perforation detecting lever 12 is moved upward and the claw 12a thereof is disengaged from the perforation of the film. Further, the common terminal $c$ makes contact with the break terminal $b$. Thus, the motor M is stopped in response to the detection of the perforation of the film. The above position is maintained until the solenoid 1 is turned ON and the operating member 16 is moved in the indicated direction to rotate the feed lever 14 in the counterclockwise direction overcoming the force of the spring 14a up to a position where the end of the feed lever 14 is engaged with the engaging lever 10 as shown in FIG. 2.

Thus, the film is automatically fed until the first perforation thereof is detected. The leader portion of the film is thus automatically fed in the camera.

When the trailer portion of the film comes to the detecting claw or when a film is not loaded in the camera, the state of the transistors Q4, Q5 and Q6 are inversed to stop the supply of power to the motor after passage of a time determined by the time constant of the resistor R9 and the capacitor C3 of the timer circuit 3. Therefore, by making the time constant of the timer circuit 3 equal to the time corresponding to the length of the trailing portion of the film, the trailing portion of the film can be automatically fed.

When a film is removed from the camera before all of its frames have been exposed and then, without releasing the shutter button SW1, the film is again loaded in the camera, the thyristor SCR2 is not turned ON and accordingly the motor is not driven to wind up the film since the common terminal c of the switch means SW2 is in contact with the break terminal b.

I claim:

1. A device for operating a film wind-up motor in a motor driven camera provided with a motor for winding up a film having one perforation per frame comprising in combination:

a mirror operating solenoid provided in the camera for swinging up a mirror in a camera body upon receipt of an electric current, a time constant circuit connected with said mirror operating solenoid for supplying an electric current thereto upon release of a shutter in the camera and stopping the supply of current when a time determined thereby has lapsed, a switch means connected with a film wind-up motor in the camera for starting supply of current to the motor upon turning off of the solenoid or upon supply of electric power to said switch means, and a film perforation detecting means provided in the camera for detecting perforations in the film loaded in the camera as the film is fed in the camera and turning off said switch means upon detection of a perforation in the film, whereby the motor is driven when the solenoid is turned off or the switch means is supplied with electric power, and the motor is stopped when the film perforation detecting means detects a perforation in the film.

2. A motor operating device for a motor driven camera as defined in claim 1 wherein a timer circuit is connected between said motor and said switch means for turning off the motor when a time determined thereby has lapsed after the motor is started in case where no perforation in the film is detected by said detecting means.

3. A motor operating device for a motor driven camera as defined in claim 1 wherein said switch means comprises an electronic switch circuit connected with said motor for driving the motor and a change-over switch connected with the electronic switch circuit connected with the motor for stopping the motor, said electronic switch circuit being connected with said solenoid and operated to drive the motor upon turning off of the solenoid or upon supply of electric power to the switch circuit, said change-over switch being connected with said film perforation detecting means and operated to stop the motor upon detection of a perforation of the film by the detecting means.

4. A motor operating device for a motor driven camera as defined in claim 3 wherein said change-over switch including a make terminal connected with said electronic switch circuit, a break terminal connected with one terminal of the motor, and a common terminal for selectively making contact with either of said make terminal or said break terminal and connected with a terminal of the motor opposite to said one terminal of the motor, whereby the motor is stopped when the common terminal of the change-over switch makes contact with the break terminal.

5. A motor operating device for a motor driven camera as defined in claim 4 wherein said common terminal is connected with a mechanical means engaged with said film perforation detecting means so that the common terminal makes contact with said break terminal upon detection of a perforation in the film by the film perforation detecting means.

* * * * *